United States Patent
Avraham Chasid et al.

(10) Patent No.: US 12,414,572 B2
(45) Date of Patent: Sep. 16, 2025

(54) METHOD FOR KOSHERING POULTRY IN SLAUGHTERHOUSES

(71) Applicant: Mordechay Avraham Chasid, Ashdod (IL)

(72) Inventors: Mordechay Avraham Chasid, Ashdod (IL); Mina Chasid, Ashdod (IL)

(73) Assignee: Mordechay Avraham Chasid, Ashdod (IL)

( * ) Notice: Subject to any disclaimer, the term of this patent is extended or adjusted under 35 U.S.C. 154(b) by 564 days.

(21) Appl. No.: 17/622,371

(22) PCT Filed: Jun. 25, 2020

(86) PCT No.: PCT/IL2020/050711
§ 371 (c)(1),
(2) Date: Dec. 23, 2021

(87) PCT Pub. No.: WO2020/261275
PCT Pub. Date: Dec. 30, 2020

(65) Prior Publication Data
US 2022/0240524 A1 Aug. 4, 2022

(30) Foreign Application Priority Data
Jun. 25, 2019 (IL) .......................................... 267645

(51) Int. Cl.
*A22C 21/00* (2006.01)
*A23B 4/02* (2006.01)

(52) U.S. Cl.
CPC ............ *A22C 21/0061* (2013.01); *A23B 4/02* (2013.01)

(58) Field of Classification Search
CPC ..... A23L 13/428; A23L 13/50; A22B 5/0082; A23B 4/02; A22C 21/0061
USPC ......................................................... 426/266
See application file for complete search history.

(56) References Cited

U.S. PATENT DOCUMENTS

| | | |
|---|---|---|
| 7,597,062 B2 | 10/2009 | Fetterhoof et al. |
| 2006/0134283 A1 | 6/2006 | Fetterhoof et al. |
| 2011/0104346 A1 | 5/2011 | Bowsman et al. |

OTHER PUBLICATIONS

Granular Salt C Product Specification, Eleotrochlor Chemical Industries LTD.
Israeli Office Action for Israel Patent Application S-01-IL-2318, S-01-IL-2318, 2pp.
PCT Search report PCT for International Application No. PCT/IL2020/050711, mailed Jun. 25, 2020, 4pp.
Israeli Search Strategy for International Application No., PCT/IL2020/050711 mailed, Sep. 17, 2020, 1pp.

(Continued)

*Primary Examiner* — Subbalakshmi Prakash
(74) *Attorney, Agent, or Firm* — The Roy Gross Law Firm, LLC; Roy D. Gross

(57) ABSTRACT

The present disclosure relates to a novel method for rendering slaughtered poultry (mainly chicken and turkey) kosher following the Jewish Kashrut laws. More particularly, the method concerns the salting and washing processes the slaughtered poultry go through prior to packaging and marketing as Kosher foods. During the novel koshering process the birds are hung on stripes, keeping them from touching and salting each other. The end product of the disclosed method of the current application is a Kosher bird that contains less salt, compared to other traditional standard koshering techniques.

10 Claims, 1 Drawing Sheet

(56) References Cited

OTHER PUBLICATIONS

Study conducted in 1994 for Israel Ministry of Environmental Protection.pdf.
Ynet Artical Coarse Salt, Apr. 10, 2010.
PCT Written Opinion for International Application No. PCT/IL2020/050711, mailed Sep. 22, 2020, 5pp.

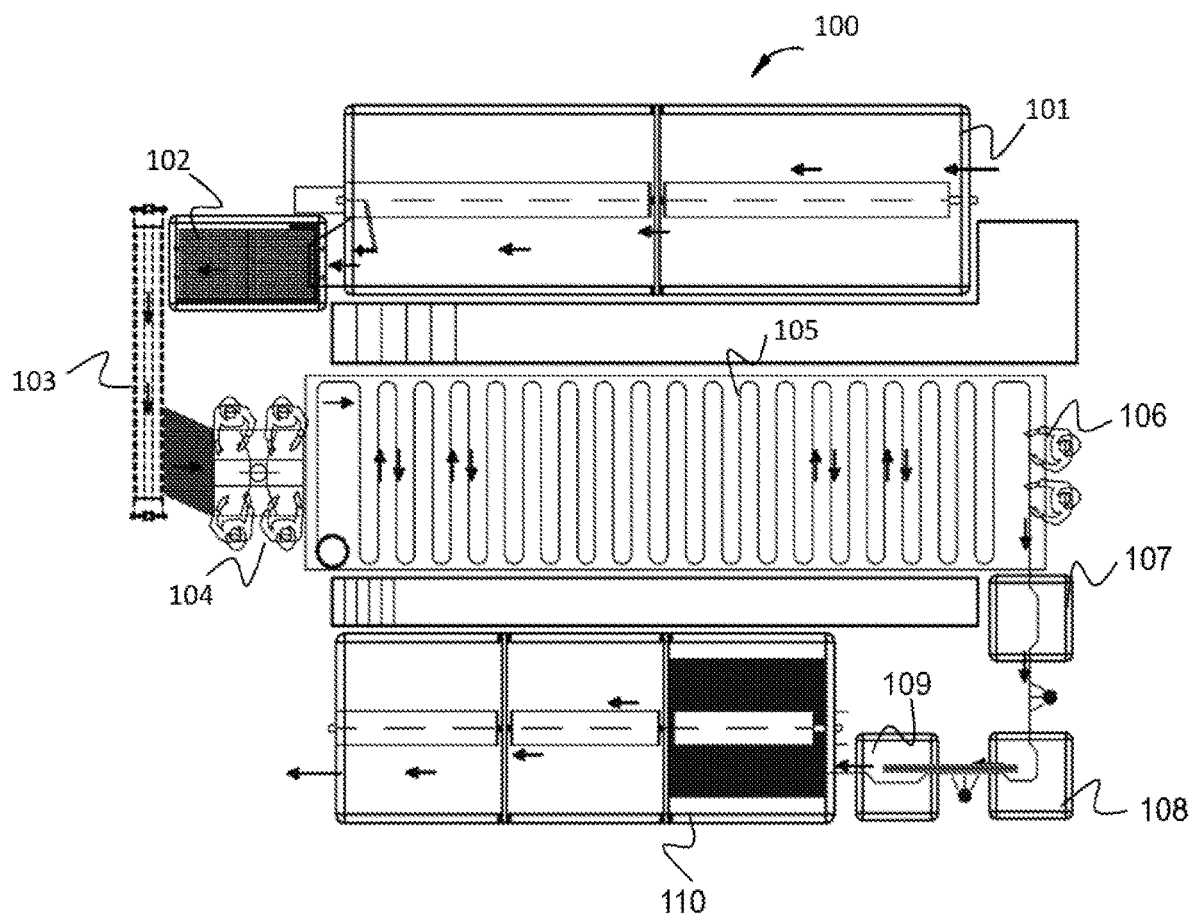

METHOD FOR KOSHERING POULTRY IN SLAUGHTERHOUSES

CROSS REFERENCE TO RELATED APPLICATIONS

This application is a National Phase of PCT Patent Application No. PCT/IL2020/050711 having International filing date of Jun. 25, 2020, which claims the benefit of priority of Israeli Patent Application No. 267645 filed on Jun. 25, 2019. The contents of the above applications are all incorporated by reference as if fully set forth herein in their entirety.

FIELD OF THE INVENTION

The present disclosure relates to a novel method for rendering slaughtered poultry (mainly chicken and turkey) kosher following the Jewish Kashrut laws. More particularly, the method concerns the salting and washing processes the slaughtered poultry undergo prior to packaging and marketing as Kosher foods. The end product of the disclosed method of the current application is a Kosher bird that contains less salt compared to other traditional standard koshering techniques.

BACKGROUND OF THE INVENTION

Jewish Kashrut laws require all meat and poultry products to undergo koshering processes aimed at clearing and removing blood from the flesh. The koshering process consists of two main steps: salting the meat and rinsing it with water. In the current situation in all slaughterhouses in Israel, birds are first inserted into a large, rotating, water-filled container for soaking and softening. The birds are subsequently poured out of the soaking container into another tank, to get drained from excessive fluids. Then, the birds are transported to a conveyor belt that carries them to the salting stations, where the slaughterhouse workers manually sprinkle salt on all parts of the birds. After salting, the birds stay on the conveyor belt for an entire hour according to the Jewish Kashrut requirements, grouped in a large pile. At the end of that hour, the birds are transported to the first washing station, which removes 50% of the salt. Then, the washed birds are transferred on the conveyor belt toward a tank, to shake off the excess salt. From the shaking tank, the birds are poured into a large water-filled container, and are mechanically transported from the container to two other water-filled containers. The slaughtered birds remain in each container for about 20 minutes. After the process is over, the birds are placed in refrigerated rooms and packed for marketing.

The above-mentioned process is far from being ideal and it has several drawbacks, the main one of which is the excessive amounts of salt left in the slaughtered koshered birds. The reasons for the large quantities of the remaining salts are due to the fact that the birds are grouped and clustered in a pile during the standard traditional process, resulting in them being pressed against each other and wallowing in salty fluids, and also due to the fact that only 50% of the salt is washed from the birds during the process. Furthermore, the salt used in the process is a "type C" salt, whose grains are about 0.8-2 mm in size. Due to this specific range of sizes, these salt grains can penetrate through the bird's skin more readily, and hence, they are more difficult to remove during the subsequent washing steps. In addition, before final package of the kosher birds, they are left to sit inside containers, which are filled with salted and dirty water. The large amounts of salt used in the process infiltrate water sources, causing a significant environmental damage. An additional disadvantage of the traditional process is the large costs derived from the amounts of water invested in the process.

According to the Israeli Ministry of Health, kosher poultry contains large amounts of salt, which are sometimes 5-10 times higher than non-kosher poultry. Excessive consumption of salt (sodium chloride) has been found to be associated with multiple health conditions, and it increases the chances of having cardiovascular diseases, kidney diseases and various types of cancers, such as stomach cancer.

According to various reports of the Organization for Economic Cooperation and Development (OECD) and the Food and Agriculture Organization of the United Nations, there has been in recent years a significant increase in poultry consumption in Israel. Consumption of chicken meat per capita in Israel is the highest among the developed countries. In 2017, meat consumption averaged 57 kilograms of chicken per year per capita and therefore, Israel is considered the country with the highest chicken meat consumption per capita among the developed countries.

In view of the above, and the various challenges and disadvantages of the traditional poultry koshering process, there is still an unmet long-felt need to facilitate and economize this process by implementing a novel method to produce kosher low sodium poultry.

BRIEF DESCRIPTION OF THE FIGURES

The accompanying drawings, which are included to provide a further understanding of the invention and are incorporated in and constitute a part of this specification, illustrate embodiments of the invention and together with the description serve to explain the principles of the invention.

FIG. 1 depicting a schematic presentation of the koshering process of the current invention;

SUMMARY OF THE INVENTION

As used herein after, the term "about" refers to any value being up to 25% lower or greater the defined measure.

As used herein after, the term "poultry" refers to any bird, whose flesh can be consumed according to the Jewish kashrut laws. These birds include: chickens, turkey, ducks, geese, pigeons, and quails.

As used herein after, the term "Jewish kashrut laws" refers to a set of dietary laws dealing with the foodstuffs that Jews are permitted to eat and how those foods must be prepared and handled according to Jewish law. Among the kashrut laws are the following: Only certain types of mammals, birds and fish meet the specific criteria of kashrut; the consumption of the flesh of any animals that do not meet these criteria, such as pork and shellfish, is forbidden. Kosher mammals and birds must be slaughtered according to a process known as shechita; blood may never be consumed and must be removed from meat by a process of salting and soaking in water for the meat to be permissible for use.

As used herein after, the term "the traditional or standard koshering process" refers to the salting and washing process currently in practice in slaughterhouses in Israel and where Jewish communities reside worldwide. This process entails the following steps: birds are first inserted into a large, rotating, water-filled container for soaking and softening. The birds are subsequently poured out of the soaking container into another tank, to get drained from excessive fluids. Then, the birds are transported to a conveyor belt that carries them to the salting stations, where the slaughterhouse workers manually sprinkle salt on all parts of the birds. After salting, the birds stay on the conveyor belt for an entire hour according to the Jewish Kashrut requirements, grouped in a large pile. At the end of that hour, the birds are transported to the first washing station, which removes about 50% of the salt. Then, the washed birds are transferred on the conveyor belt toward a tank, to shake off the excess salt. From the shaking tank, the birds are poured into a large water-filled container, and are mechanically transported from the container to two other water-filled containers. The slaughtered birds remain in each container for about 20 minutes.

As used herein after, the term "Type C salt" refers to a salt used in the process of koshering poultry. It is a commercial mixture of size-varying grains (crystals) of about 0.8-2 mm. This salt can be for example sodium chloride.

As used herein after, the term "Type D salt" refers to a salt used in the process of koshering poultry. It is a commercial mixture of size-varying grains (crystals) of about 0.8-3.35 mm. This salt can be for example sodium chloride.

As used herein after, the term "low sodium" refers to a poultry produced by the method of the present invention, containing significantly lower amounts of sodium (salt) compared to poultry produced during the traditional koshering and salting process. This low-sodium poultry contains in a non-limiting way an averaged sodium concentration of about 100-200 mg Na/100 gr meat.

The present invention provides a method for koshering poultry in slaughterhouses by steps of salting and washing. In the current method, the birds are hung on specialized moveable strips (lines), and therefore are not left to sit in salty fluids. The end product of the discloses method is a low-sodium kosher poultry.

Hence, it is one object of the present invention to disclose a method for koshering poultry comprising steps of:
  a. soaking said poultry in a water-filled tank for softening;
  b. salting said poultry;
  c. hanging said poultry on a moveable strip;
  d. washing the salt off of said poultry;
  e. dipping said poultry in three consecutive water-filled dipping containers;
  f. washing said poultry between each dip of step (e); and
  g. soaking said poultry in a water bath,
wherein said salting is executed with a salt, whose grain size is 0.8-3.35 mm.

It is a further object of the present invention to disclose the method as disclosed above, wherein said poultry remain hung on said moveable strip for at least about one hour.

It is a further object of the present invention to disclose the method as disclosed above, wherein said method is carried out in slaughterhouses.

It is a further object of the present invention to disclose the method as disclosed above, wherein said washing the salt off of said poultry is executed to remove all said salt of said poultry.

It is a further object of the present invention to disclose the method as disclosed above, wherein said water-filled dipping containers are filled with unsalted water.

It is a further object of the present invention to disclose the method as disclosed above, wherein said poultry remain hung on said moveable strip during said dip and between said each dip.

It is a further object of the present invention to disclose the method as disclosed above, wherein said salting, soaking and washing steps are executed according to the Jewish kashrut laws.

It is another object of the present invention to disclose a low-sodium kosher poultry produced by the method disclosed above.

It is a further object of the present invention to disclose the low-sodium kosher poultry as disclosed above, wherein said poultry comprises an average sodium concentration of about 100-200 mg sodium per 100 gr meat.

DETAILED DESCRIPTION OF THE PREFERRED EMBODIMENTS

The following description is provided, alongside all chapters of the present invention, so as to enable any person skilled in the art to make use of the invention and sets forth the best modes contemplated by the inventor of carrying out this invention. Various modifications, however, are adapted to remain apparent to those skilled in the art, since the generic principles of the present invention have been defined specifically to provide a method for The present invention describes a new method for koshering poultry comprising steps of salting and washing the birds in slaughterhouses after slaughtering. In the new method disclosed in the current application, the salt used for poultry koshering is a coarser salt than the salt used in common practice, and its grains are larger compared with the salt used in the standard traditional process. The salt of the current application is referred to as "Type D" salt and it is a commercial mixture of salt grains characterized by varying sizes of about 0.8-3.35 mm. This type of salt penetrates the poultry's skin to a lesser extent, and is washed away from the birds more easily than "Type C" salt, which is currently used in the traditional process. An additional change to the traditional process concerns the transportation of the poultry from one station to another. After salting the slaughtered poultry, instead of piling the birds together and placing them on conveyor belts, the birds are hung on specialized hangers placed on lines (moveable strips), thus, remaining free of contact among themselves. In the disclosed method the birds drip the salty fluids on the conveyor belts below them, rather than on each other. The following step comprises a complete and thorough wash of the poultry, which removes almost all the salt grains of them, compared to the traditional process, in which only about 50% of the salt is washed off.

Then, the hung birds are dipped inside three consecutive water-filled dipping containers and are washed between each dip. Contrary to the traditional koshering process, the water inside the dipping containers is clean and are not salted water. Since the birds were exposed to a thorough, meticulous wash in the previous stages, which removed all the salt from them, it is unlikely that the birds drip salty fluids into the dipping containers, which would result in salinating the next birds in line. Furthermore, the birds still remain hung during the dipping stage on the moveable strip, and they are not left to sit a long period of time inside the dipping containers (contrary to the traditional koshering process). As a result, the water which comes in contact with the birds becomes less dirty, and the physical location, where dirty, salty water accumulates in the slaughterhouse, is reduced by 25%, directly reflecting a decrease in the costs of cleaning which are very expensive.

After completing the steps required by Jewish kashrut laws, the birds undergo an additional soaking in a water bath to remove any potentially remaining salt grains, and then they are shipped to the cooling rooms until they are packed and marketed as kosher low-sodium poultry.

Table 1. below presents data on the amounts of salt (sodium chloride) in kosher slaughtered poultry that were exposed the novel koshering method of the current application compared to poultry undergoing the standard traditional koshering process.

TABLE 1 average sodium concentrations in poultry of the current application compared with traditionally koshered poultry

|  | Average sodium con. (mg/100 gr) after traditional koshering process | Average sodium con. (mg/100 gr) after the koshering process of the current application |
| --- | --- | --- |
| Breast | 360 | 111 |
| Wings | 527 | 182 |
| Leg (drumstick) | 347 | 174 |

Reference in now made to FIG. 1 depicting a station 100 for koshering poultry in slaughterhouses. The process begins with placing the birds inside a water-filled soaking tank 101, where the birds undergo a softening process prior to the salting process. The birds are mechanically rolled inside the tank 101 until they arrive to a drum drier 102. Then, the birds are transported from the drum drier 102 on a conveyor belt 103 toward two salting stations 104, where the workers manually salt the birds and hang them separately on a moveable strip 105. The birds remain hung on the moveable strip 105 for a period of one hour as required by the Jewish kashrut laws. During this hour, the birds drip salty fluids on the conveyor belt below them. Subsequently, the birds are moved while hung on the moveable strip 105 toward the washing station 106 where they undergo a complete and thorough wash to remove all the salt grains. The following step comprises transporting the birds to three water-filled dipping containers 107-109. The birds are dipped in each dipping container and are washed between each dip, while remaining hung on the moveable strip 105. At the end of the process the birds are soaked in a water bath 110 to ensure almost all the salt grains are removed, and subsequently shipped to refrigerating rooms till packaging and marketing as low-sodium kosher poultry.

The invention claimed is:

1. A method for koshering slaughtered poultry following evisceration, comprising the steps of:

a. soaking and softening the poultry in a water-filled tank;
 b. removing the poultry from the water-filled tank;
 c. applying dry salt to the surface of the poultry by manual or mechanical means, ensuring uniform coverage in accordance with koshering requirements;
 d. hanging the poultry separately and not in clusters on a moveable strip;
 e. washing salt off of the poultry;
 f. dipping the poultry in three consecutive unsalted water-filled dipping containers;
 g. washing the poultry between each dip of step (f);
 h. soaking the poultry in an unsalted water bath; and
 i. removing the poultry from the water bath and transferring the poultry to refrigeration for subsequent packaging;
 wherein the salting is executed with a salt comprising at least 85% of particles having a grain size between 0.8 mm and 3.35 mm.

2. The method of claim 1, wherein the poultry is selected from the group consisting of chickens, turkeys, ducks, geese, pigeons, and quails or any combination thereof.

3. The method of claim 1, wherein the poultry remain hung on the moveable strip for at least about one hour.

4. The method of claim 1, wherein the method is carried out in a slaughterhouse.

5. The method of claim 1, wherein washing the salt off of the poultry in steps (e) and (g) is performed to remove the salt from the poultry surface.

6. The method of claim 1, wherein the water in the dipping containers and water bath is unsalted.

7. The method of claim 1, wherein the poultry remains hung on the moveable strip during the dipping and between each dipping.

8. The method of claim 1, wherein the salting, soaking, and washing steps are executed according to Jewish kashrut laws.

9. The method of claim 1, wherein the salt is sodium chloride.

10. A kosher poultry product produced by the method of claim 1,
 wherein the product comprises:
 a. sodium chloride as the salt used in the koshering process; and
 b. an average sodium concentration of about 100-200 mg of sodium per 100 grams of meat.

\* \* \* \* \*